United States Patent
Tamane et al.

(10) Patent No.: US 10,967,832 B2
(45) Date of Patent: Apr. 6, 2021

(54) REMOTE STARTUP SYSTEM, CENTER SERVER, AND VEHICLE

(71) Applicant: TOYOTA JIDOSHA KABUSHIKI KAISHA, Toyota (JP)

(72) Inventors: Yasuyuki Tamane, Miyoshi (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/949,798

(22) Filed: Apr. 10, 2018

(65) Prior Publication Data

US 2018/0297556 A1    Oct. 18, 2018

(30) Foreign Application Priority Data

Apr. 12, 2017  (JP) .............................. JP2017-079286

(51) Int. Cl.
  *B60R 25/04*    (2013.01)
  *B60R 25/10*    (2013.01)
  *B60R 25/20*    (2013.01)
  *B60R 25/01*    (2013.01)

(52) U.S. Cl.
  CPC .............. *B60R 25/04* (2013.01); *B60R 25/01* (2013.01); *B60R 25/2018* (2013.01)

(58) Field of Classification Search
  CPC ......... B60R 25/04; B60R 25/20; B60R 25/00; B60R 25/045; B60R 25/1003; B60R 25/24; B60R 25/209; F02N 11/08; G08C 17/02; B60K 35/00; G07C 9/00309
  See application file for complete search history.

(56) References Cited

U.S. PATENT DOCUMENTS

| | | | |
|---|---|---|---|
| 2005/0012601 A1* | 1/2005 | Matsubara | B60R 25/1003 340/426.1 |
| 2006/0087405 A1* | 4/2006 | Koike | G07C 9/00309 340/5.64 |
| 2006/0164230 A1* | 7/2006 | DeWind | B60K 35/00 340/461 |

(Continued)

FOREIGN PATENT DOCUMENTS

| | | |
|---|---|---|
| JP | 2006009650 A | 1/2006 |
| JP | 2011213308 A | 10/2011 |

(Continued)

*Primary Examiner* — Yuri Kan
(74) *Attorney, Agent, or Firm* — Hunton Andrews Kurth LLP

(57) ABSTRACT

A remote startup system includes a terminal of a user, a center server that is configured to communicate with the terminal, and a vehicle that is configured to communicate with the center server, and starts up an engine of the vehicle according to a startup request transmitted from the terminal to the center server. The remote startup system includes a lock information acquisition unit configured to acquire lock information indicating whether or not the vehicle is locked when the startup request is transmitted from the terminal to the center server or when a function of transmitting the startup request that is included in the terminal is activated, and a controller configured to change a startup manner of the engine based on the startup request according to whether the lock information indicates that the vehicle is locked or indicates that the vehicle is unlocked.

11 Claims, 9 Drawing Sheets

(56) References Cited

U.S. PATENT DOCUMENTS

| | | | |
|---|---|---|---|
| 2008/0117079 A1* | 5/2008 | Hassan | B60R 25/045 340/901 |
| 2008/0129473 A1 | 6/2008 | Tsuruta et al. | |
| 2011/0202201 A1* | 8/2011 | Matsubara | B60R 25/00 701/2 |
| 2013/0073121 A1* | 3/2013 | Kim | B60R 25/209 701/2 |
| 2013/0151037 A1 | 6/2013 | Harumoto et al. | |
| 2013/0261941 A1* | 10/2013 | Nishimura | F02N 11/0807 701/113 |
| 2014/0313009 A1* | 10/2014 | King | G08C 17/02 340/5.61 |
| 2014/0316610 A1* | 10/2014 | Tomita | B60R 25/24 701/2 |
| 2018/0215345 A1* | 8/2018 | Elangovan | B60R 25/01 |

FOREIGN PATENT DOCUMENTS

| | | |
|---|---|---|
| JP | 2013-067364 A | 4/2013 |
| JP | 2013123095 A | 6/2013 |
| JP | 2013-238184 A | 11/2013 |

* cited by examiner

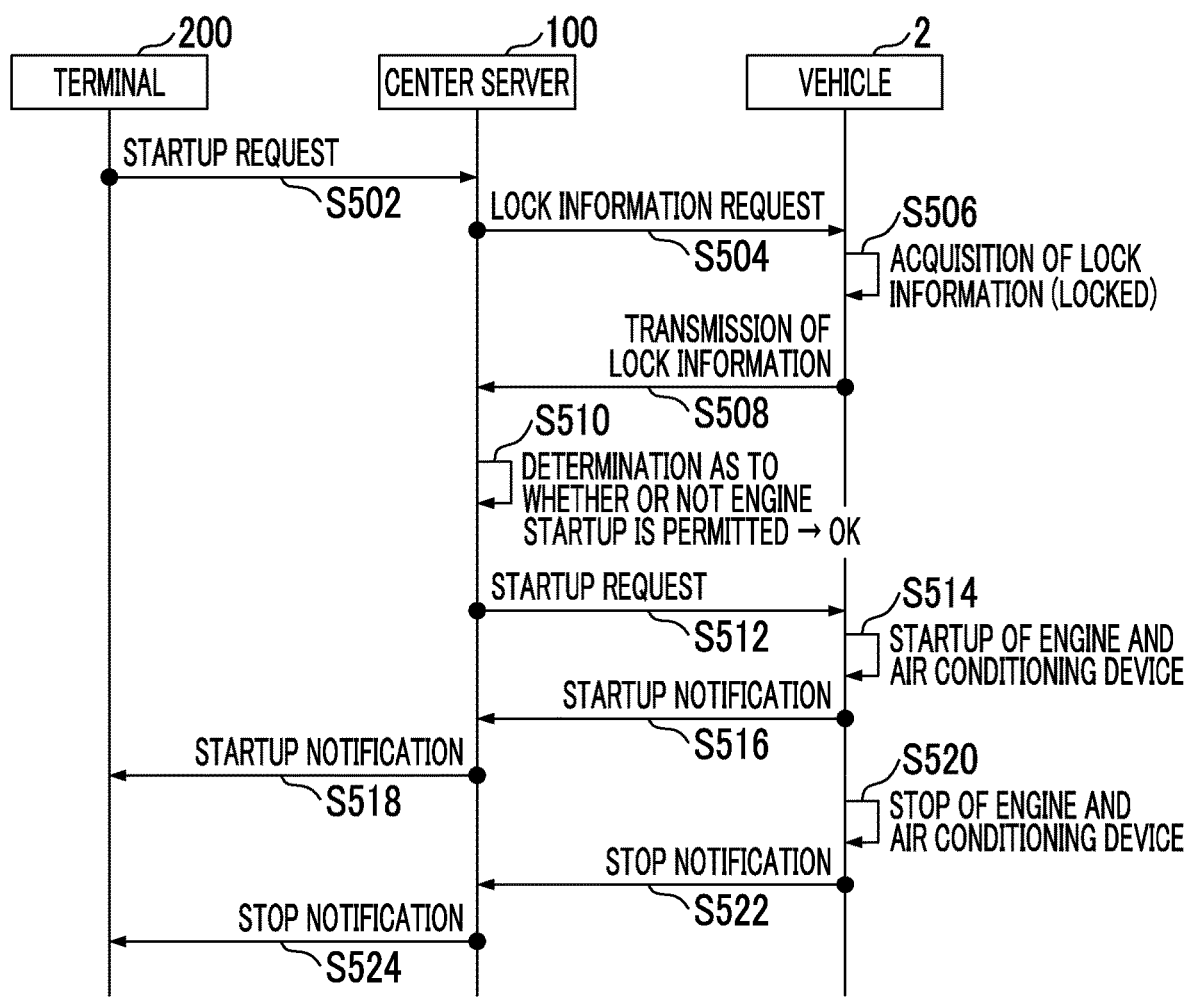

REMOTE STARTUP SYSTEM, CENTER SERVER, AND VEHICLE

INCORPORATION BY REFERENCE

The disclosure of Japanese Patent Application No. 2017-079286 filed on Apr. 12, 2017 including the specification, drawings and abstract is incorporated herein by reference in its entirety.

BACKGROUND

1. Technical Field

The present disclosure relates to a remote startup system for an engine of a vehicle, a center server, and a vehicle.

2. Description of Related Art

A center type remote startup system that starts up an engine of a vehicle according to a startup request transmitted from a terminal carried by a user to a vehicle remotely located via a center server has been known (see, for example, Japanese Unexamined Patent Application Publication No. 2013-238184 (JP 2013-238184 A), or the like).

SUMMARY

However, when the engine of the vehicle is started up via a center server, the engine of the vehicle can be started up even from a relatively separated place at which a user cannot visually recognize the vehicle, and therefore, when the engine of the vehicle is started up in a state in which the vehicle is unlocked, there is a high possibility of a third party other than an owner of the vehicle starting driving of the vehicle.

The present disclosure provides a center type remote startup system, a center server, and a vehicle capable of reducing a possibility of a third party other than an owner of a vehicle being able to use the vehicle.

A first aspect of the present disclosure relates to a remote startup system. The remote startup system includes a terminal of a user, a center server that is configured to communicate with the terminal, and a vehicle that is configured to communicate with the center server. The remote startup system is configured to start up an engine of the vehicle according to a startup request transmitted from the terminal to the center server. The remote startup system includes a lock information acquisition unit configured to acquire lock information indicating whether or not the vehicle is locked when the startup request is transmitted from the terminal to the center server or when a function of transmitting the startup request that is included in the terminal is activated; and a controller configured to change a startup manner of the engine based on the startup request according to whether the lock information indicates that the vehicle is locked or indicates that the vehicle is unlocked.

According to the first aspect of the present disclosure, when the lock information indicates that the vehicle is unlocked, it is possible to make it difficult to start up the engine of the vehicle based on the startup request transmitted from the terminal to the center server. Therefore, it is possible to reduce a possibility of a third party other than an owner of the vehicle being able to use the vehicle.

In the remote startup system according to the first aspect of the present disclosure, the controller may be configured to prohibit startup of the engine based on the startup request as long as the vehicle is not locked when the lock information indicates that the vehicle is unlocked.

According to the first aspect of the present disclosure, when the vehicle is unlocked, it is possible to prohibit the startup of the engine of the vehicle based on the startup request transmitted from the terminal to the center server as long as the vehicle is not locked. Therefore, it is possible to reduce a possibility of a third party other than an owner of the vehicle being able to use the vehicle.

The remote startup system according to the first aspect of the present disclosure may further include a notification unit provided in the terminal, the notification unit being configured to notify the user that the vehicle is unlocked when the lock information indicates that the vehicle is unlocked; and a display unit provided in the terminal, the display unit being configured to display a selection screen for causing the user to select whether to desire to start up the engine when the lock information indicates that the vehicle is unlocked, and the startup request is transmitted from the terminal to the center server. The controller may be configured to start up the engine according to the startup request when an operation for selecting startup of the engine is performed with respect to the selection screen when the lock information indicates that the vehicle is unlocked.

According to the first aspect of the present disclosure, when the vehicle is unlocked, it is possible to confirm whether or not the user desires to start up the engine of the vehicle. Therefore, for example, when the user and the vehicle are far apart from each other, the user can cancel the startup of the engine of the vehicle, and therefore, it is possible to reduce a possibility of a third party other than an owner of the vehicle being able to use the vehicle.

In the remote startup system according to the first aspect of the present disclosure, the controller may be configured to prohibit transmission of the startup request from the terminal to the center server in a case where the lock information acquired by the lock information acquisition unit when the function is activated indicates that the vehicle is unlocked.

According to the first aspect of the present disclosure, in a case where the vehicle is unlocked at a point in time when the function of transmitting the startup request from the terminal to the center server is activated, the startup request cannot be transmitted from the terminal. Therefore, it is possible to reduce a possibility of a third party other than an owner of the vehicle being able to use the vehicle.

The remote startup system according to the first aspect of the present disclosure may further include a terminal transmission unit provided in the terminal, the terminal transmission unit being configured to transmit a lock request for requesting lock of the vehicle to the center server; a server transmission unit provided in the center server, the server transmission unit being configured to transmit the lock request received from the terminal to the vehicle; a lock processing unit provided in the vehicle, the lock processing unit being configured to lock the vehicle when the lock request is received from the center server; and a notification unit provided in the terminal, the notification unit being configured to notify the user that the vehicle is unlocked when the lock information indicates that the vehicle is unlocked.

According to the first aspect of the present disclosure, it is possible to remotely lock the vehicle according to the lock request transmitted from the terminal to the center server. Further, when the vehicle is unlocked, a user is notified that the vehicle is unlocked, and it is possible to recognize a reason why the startup manner of the engine of the vehicle has been changed. Therefore, the user can start up the engine of the vehicle by remotely locking the vehicle, for example, by transmitting the startup request from the terminal again.

The remote startup system according to the first aspect of the present disclosure may further include a display unit provided in the terminal, the display unit being configured to display a selection screen for causing the user to select whether to lock the vehicle when the lock information indicates that the vehicle is unlocked. The terminal transmission unit may be configured to transmit the lock request to the center server when an operation for selecting lock of the vehicle is performed with respect to the selection screen.

According to the first aspect of the present disclosure, when the vehicle is unlocked, a screen for causing the user to select whether or not to remotely lock the vehicle is automatically displayed. Therefore, it is possible to perform lock of the vehicle through an operation in the selection screen. Therefore, convenience of the user can be improved.

In the remote startup system according to the first aspect of the present disclosure, the controller may be configured to start up the engine in a case where the vehicle is locked by the lock processing unit within a predetermined time even when the lock information acquired by the lock information acquisition unit when the startup request is transmitted from the terminal to the center server indicates that the vehicle is unlocked.

According to the first aspect of the present disclosure, even when the vehicle is unlocked at the time of transmission of the startup request from the terminal to the center server, the engine of the vehicle is started up without transmitting the startup request again when the vehicle is remotely locked within a predetermined time. Therefore, it is possible to omit labor of transmitting the startup request again, and to improve convenience of the user.

The remote startup system according to the first aspect of the present disclosure may further include a vehicle transmission unit provided in the vehicle, the vehicle transmission unit being configured to transmit data to the center server. The server transmission unit may be configured to transmit a lock information request for requesting the lock information to the vehicle when the startup request or an activation notification indicating that the function is activated is received from the terminal. The lock information acquisition unit may be provided in the vehicle and configured to acquire the lock information when the lock information request is received from the center server. The vehicle transmission unit may be configured to transmit the lock information acquired by the lock information acquisition unit to the center server. The controller may be provided in the center server and configured to change the startup manner based on the lock information received from the vehicle.

According to the first aspect of the present disclosure, with the controller provided in the center server, it is possible to realize the process of changing the startup manner of the engine of the vehicle based on the startup request transmitted from the terminal to the center server.

In the remote startup system according to the first aspect of the present disclosure, the server transmission unit may be configured to transmit the startup request or an activation notification indicating that the function is activated to the vehicle when the startup request or the activation notification is received from the terminal. The lock information acquisition unit may be provided in the vehicle and configured to acquire the lock information when the startup request or the activation notification is received from the center server. The controller may be provided in the vehicle and configured to change the startup manner based on the lock information acquired by the lock information acquisition unit.

According to the first aspect of the present disclosure, with the controller provided in the vehicle, it is possible to realize the process of changing the startup manner of the engine of the vehicle based on the startup request transmitted from the terminal to the center server.

In the remote startup system according to the first aspect of the present disclosure, the remote startup system may further include: a user position information acquisition unit configured to acquire position information of the terminal; and a vehicle position information acquisition unit configured to acquire position information of the vehicle. The controller may be configured to start up the engine according to the startup request regardless of content of the lock information when a distance between the vehicle and the terminal is equal to or smaller than a predetermined threshold value from the position information of the terminal acquired by the user position information acquisition unit and the position information of the vehicle acquired by the vehicle position information acquisition unit.

According to the first aspect of the present disclosure, when a distance between the vehicle and the user, that is, a distance between the vehicle and the terminal is equal to or smaller than a predetermined threshold value, which indicates that the vehicle and the terminal can be determined to be relatively close to each other, the engine of the vehicle is started up according to the startup request that is transmitted from the terminal to the center server regardless of content of the lock information. Thus, because it is conceivable that a possibility of the vehicle being used by a third party is low when the distance between the vehicle and the user is small to a certain extent, convenience of the user can be prioritized.

A second aspect of the present disclosure relates to a center server connected to a terminal of a user and a vehicle and configured to communicate with the terminal and the vehicle. The center server is configured to receive a startup request of an engine of the vehicle that is transmitted from the terminal and transmit the startup request to the vehicle to start up the engine. The center server includes a server transmission unit configured to transmit a lock information request for requesting lock information indicating whether or not the vehicle is locked to the vehicle when the startup request or an activation notification indicating that a function of transmitting the startup request included in the terminal is activated is received from the terminal; and a controller configured to change a startup manner of the engine based on the startup request according to whether the lock information received from the vehicle indicates that the vehicle is locked or indicates that the vehicle is unlocked.

A third aspect of the present disclosure relates to a vehicle communicatably connected to a center server that is configured to communicate with a terminal of a user. The vehicle is configured to start up an engine according to a startup request for requesting startup of the engine that is transmitted from the terminal via the center server. The vehicle includes a lock information acquisition unit configured to acquire lock information indicating whether or not the vehicle is locked when the startup request or an activation notification indicating that a function of transmitting the startup request included in the terminal is activated, the activation notification being transmitted from the terminal via the center server, is received from the center server; and a controller configured to change a startup manner of the engine based on the startup request according to whether the lock information indicates that the vehicle is locked or indicates that the vehicle is unlocked.

According to the aspects of the present disclosure described above, it is possible to provide a center type remote startup system, a center server, and a vehicle capable of reducing a possibility of a third party other than an owner of the vehicle being able to use the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a sequence diagram schematically illustrating an example and another example of an operation of the remote startup system according to the first embodiment;

DETAILED DESCRIPTION OF EMBODIMENTS

Hereinafter, modes for carrying out the disclosure will be described with reference to the drawings.

First Embodiment

Configuration of Remote Startup System

A configuration of the remote startup system 1 according to the embodiment will be described with reference to FIGS. 1 to 4.

Figure 1:
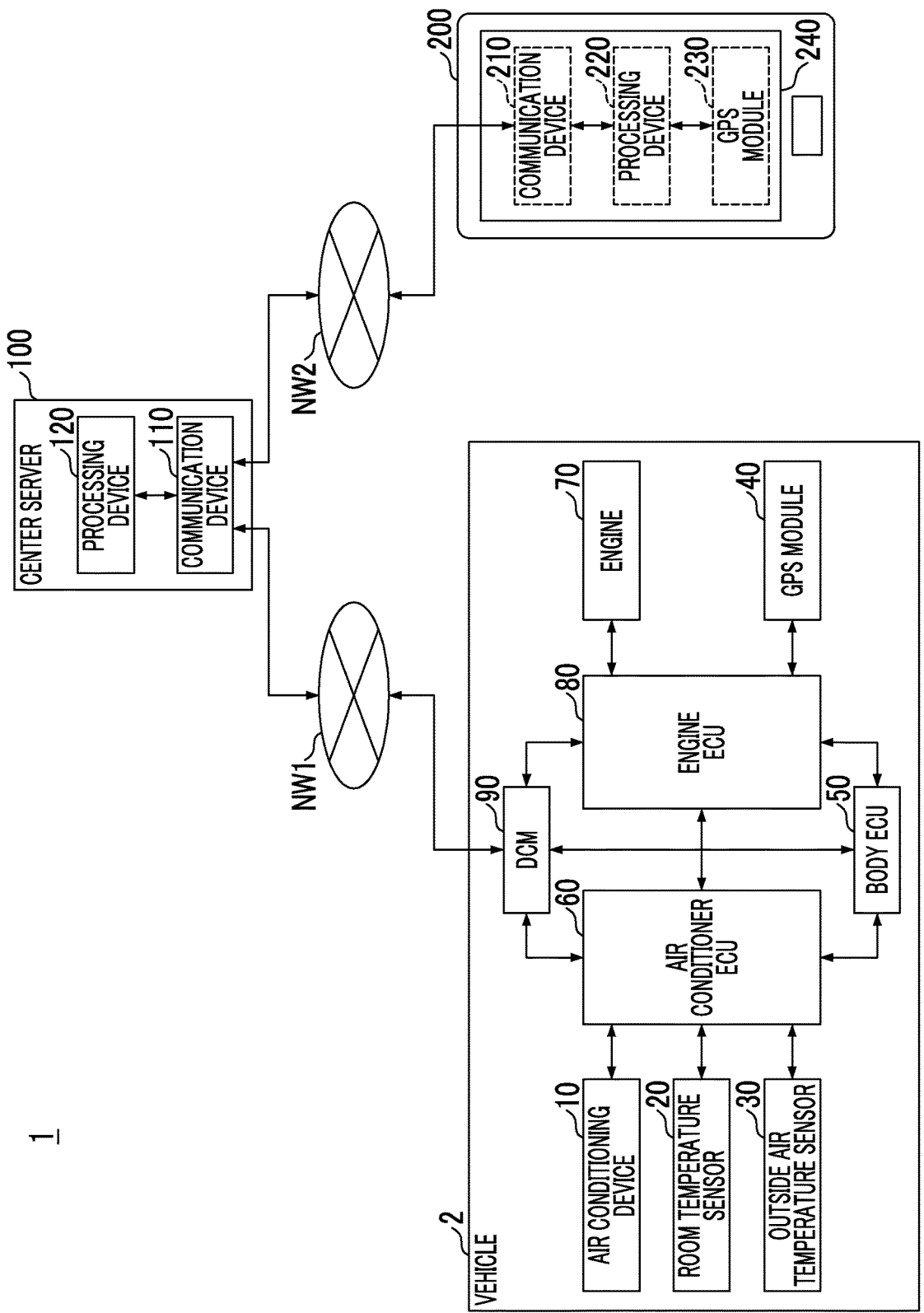
FIG. 1 is a configuration diagram illustrating an example of a configuration of a remote startup system.
Figure 2:
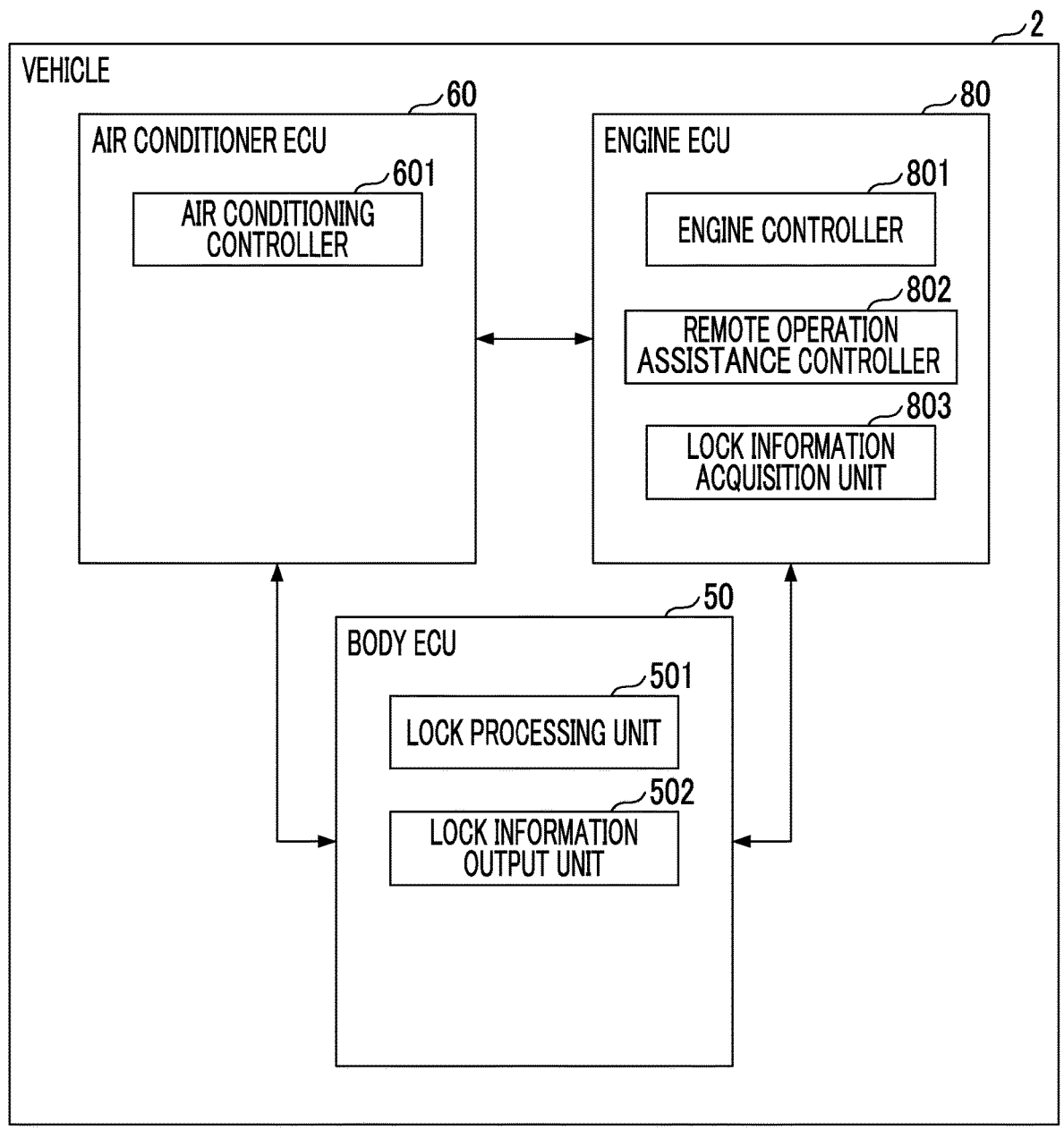
FIG. 2 is a functional block diagram illustrating an example of a functional configuration of a vehicle (a body ECU, an air conditioner ECU, and an engine ECU) according to a first embodiment.
Figure 3:
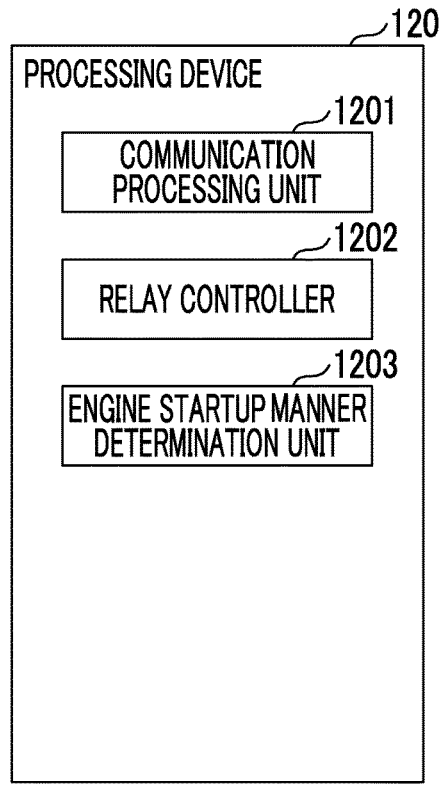
FIG. 3 is a functional block diagram illustrating an example of a functional configuration of a center server (processing device) according to the first embodiment.
Figure 4:
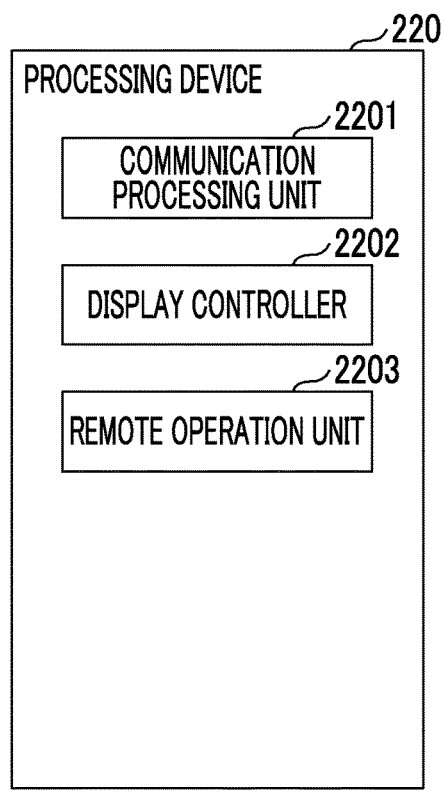
FIG. 4 is a functional block diagram illustrating an example of a functional configuration of a terminal (a processing device)

FIG. 1 is a configuration diagram illustrating an example of a configuration of a remote startup system 1 according to the embodiment. FIG. 2 is a functional block diagram illustrating an example of a functional configuration of a vehicle 2 (a body ECU 50, an air conditioner ECU 60 or an engine ECU 80) according to the embodiment. FIG. 3 is a functional block diagram illustrating an example of a functional configuration of a center server 100 (a processing device 120) according to the embodiment. FIG. 4 is a functional block diagram illustrating an example of a functional configuration of a terminal 200 (a processing device 220) according to the embodiment.

The remote startup system 1 includes a vehicle 2, a center server 100, and a terminal 200 carried by a user, and starts up an engine 70 and an air conditioning device 10 of the vehicle 2 to be described below according to a startup request that is transmitted from the terminal 200 to the vehicle 2 via the center server 100.

The vehicle 2 includes an air conditioning device 10, a room temperature sensor 20, an outside air temperature sensor 30, a global positioning system (GPS) module 40, a body electronic control unit (ECU) 50, an air conditioner ECU 60, an engine 70, an engine ECU 80, and a data communication module (DCM) 90.

The air conditioning device 10 adjusts, for example, a temperature in the cabin of the vehicle 2. The air conditioning device 10 includes, for example, a refrigeration cycle including an evaporator (not illustrated) and a compressor (not illustrated) that is driven by the engine 70 of the vehicle, and a heater (not illustrated) using coolant of the engine 70 of the vehicle as a heat source. Under the control of the air conditioner ECU 60 (the air conditioning controller 601 to be described below), the air conditioning device 10 adjusts a temperature of air sent from an air outlet by appropriately setting a ratio of air cooled by passing through the evaporator (cold air) to air warmed using the coolant of the engine 70 of the vehicle as a heat source (hot air) in a changeable manner. The air conditioning device 10 has a defroster mode, and removes frost that is generated on the outdoor of a windshield of the vehicle 2 or fogging generated on the inside of the windshield of the vehicle 2 by sending air having a relatively low humidity and a relatively high temperature along the windshield of the vehicle 2 from the air outlet corresponding to the defroster mode.

The room temperature sensor 20 is provided in the cabin of the vehicle 2, such as the inside of an instrument panel (not illustrated), and detects a temperature in the cabin (room temperature). The room temperature sensor 20 is communicatably connected to the air conditioner ECU 60 via a one-to-one communication line or the like, and a detection signal corresponding to the detected room temperature is input to the air conditioner ECU 60.

The outside air temperature sensor 30 is provided in the outdoor of the vehicle 2 such as a front end portion of an engine compartment provided in a front portion of the vehicle 2 (a portion into which outside air is introduced), that is, on the back side of a front grille of the vehicle 2, and detects a temperature of the outdoor (outside air temperature) of the vehicle 2. The outside air temperature sensor 30 is communicatably connected to the air conditioner ECU 60 via a one-to-one communication line or the like, and a detection signal corresponding to the detected outdoor air temperature is input to the air conditioner ECU 60.

The GPS module 40 receives GPS signals that are transmitted from three or more satellites, preferably, four or more satellites above the vehicle 2, and measures a position of the vehicle 2 on which the GPS module 40 is mounted. The GPS module 40 is communicatably connected to the engine ECU 80 or the like via a one-to-one communication line or an in-vehicle network such as a controller area network (CAN), and position information of the vehicle 2 of which the position has been measured is transmitted to the engine ECU 80 or the like.

The body ECU 50 is an electronic control unit that drives an actuator (not illustrated) (for example, a door lock motor)

that locks or unlocks a door of the vehicle 2 and controls a locked and unlocked state of the door of the vehicle 2. The door of the vehicle 2 includes a side door for allowing an occupant to get in and out of a cabin of the vehicle 2, a back door for accessing a luggage room, a trunk lid, and the like. Hereinafter, a state in which the vehicle 2 is locked means a state in which all of a plurality of doors of the vehicle 2 are locked. A state in which a door of the vehicle 2 is unlocked means a state in which at least one of doors are unlocked. A function of the body ECU 50, for example, may be realized by any hardware, any software, or a combination thereof, and may be configured of, for example, a microcomputer including a central processing unit (CPU), a random access memory (RAM), a read only memory (ROM), an auxiliary storage device, an input-output (I/O) interface, and the like. The body ECU 50 includes, for example, a lock processing unit 501 and a lock information output unit 502 as functional units that are realized by executing, on a CPU, one or more programs stored in a ROM or an auxiliary storage device.

The body ECU 50, the air conditioner ECU 60, the engine ECU 80, and the DCM 90 are communicatably connected to each other over an in-vehicle network based on a communication protocol such as a CAN.

The lock processing unit 501 locks the door of the vehicle 2 according to a lock request transmitted from the terminal 200 via the center server 100 and received by the DCM 90. Specifically, the lock processing unit 501 outputs a drive command for locking the vehicle 2 to the actuator according to the lock request.

The lock information output unit 502 outputs lock information indicating whether or not the vehicle 2 is locked to the engine ECU 80 according to a lock information acquisition request received from the engine ECU 80, as described below.

The air conditioner ECU 60 is an electronic control unit that performs various controls regarding the air conditioning device 10. The function of the air conditioner ECU 60 may be realized by any hardware, software, or a combination thereof, and may be mainly configured of a microcomputer including a CPU, a RAM, a ROM, an auxiliary storage device, an I/O, and the like. The air conditioner ECU 60 includes, for example, an air conditioning controller 601 as a functional unit that is realized by executing, on the CPU, one or more programs stored in the ROM or the auxiliary storage device.

The air conditioning controller 601 controls an operation of the air conditioning device 10 according to a set state of a set temperature, a mode (a plurality of air outlet modes according to a combination of the air outlets or defroster mode), and the like. Specifically, the air conditioning controller 601 controls the operation of the air conditioning device 10, for example, so that the room temperature becomes the set temperature, based on a detected value of the room temperature sensor 20, the outside air temperature sensor 30, and the like. The air conditioning controller 601 starts up the air conditioning device 10 according to an air conditioning startup request from a remote operation support controller 802 to be described below and controls the operation of the air conditioning device 10 according to setting content included in the air conditioning startup request.

The engine 70 of the vehicle is a driving force source of the vehicle 2. The engine 70 of the vehicle operates by burning gasoline, light oil, or the like supplied from a fuel tank (not illustrated) via a fuel pump (not illustrated) in a cylinder under the control of the engine ECU 80. The engine 70 of the vehicle, specifically, various actuators (a fuel injection device that injects fuel, an ignition device that ignites gasoline injected into the cylinder, an electric motor for changing an opening and closing timing of an intake or exhaust valve, or the like) assembled in the engine 70 of the vehicle are communicatably connected to the engine ECU 80 via a one-to-one communication line or the like, and are operated according to a control command transmitted from the engine ECU 80.

The engine ECU 80 is an electronic control unit that performs various control processes of the engine 70 of the vehicle including a starter (not illustrated). A function of the engine ECU 80 may be realized by any hardware, any software, or a combination thereof. For example, the engine ECU 80 may be mainly configured of a microcomputer including a CPU, a RAM, a ROM, an auxiliary storage device, an I/O, and the like. The engine ECU 80 includes, for example, an engine controller 801, a remote operation support controller 802, and a lock information acquisition unit 803 as functional units that are realized by executing one or more programs stored in the ROM or the auxiliary storage device.

The engine controller 801 performs operation control of the engine 70 of the vehicle according to an operation state by a driver of the vehicle 2 (for example, an accelerator operation amount or a selected gear shift stage of a transmission (not illustrated)), an environmental state of the vicinity of the vehicle 2 (for example, an outside air temperature), or the like. For example, when an ignition switch (IG switch) is turned ON (IG-ON) or when an engine startup request is input from the outside, the engine controller 801 starts up the engine 70 of the vehicle. Specifically, the engine controller 801 switches a relay (not illustrated) for energizing a starter to a connected state to drive the starter, and appropriately controls a fuel injection device and an ignition device according to cranking by the starter to start up the engine 70 of the vehicle.

According to a startup request that is received from the terminal 200 via the center server 100, the remote operation support controller 802 transmits an engine startup request and an air conditioning startup request to the engine controller 801 and the air conditioning controller 601, respectively, to start up the engine 70 and the air conditioning device 10 of the vehicle. When a predetermined end condition is satisfied after the engine 70 and the air conditioning device 10 of the engine of the vehicle are started up, the remote operation support controller 802 transmits an engine stop request and an air conditioning stop request to the engine controller 801 and the air conditioning controller 601, respectively, to stop the engine 70 and the air conditioning device 10 of the vehicle. For example, when a set operation time included in the startup request or defined in advance has elapsed from the startup of the engine 70 and the air conditioning device 10 of the vehicle as an end condition, the remote operation support controller 802 may stop the engine 70 and the air conditioning device 10 of the vehicle. Further, for example, when the room temperature has been determined to have increased to a set temperature included in the startup request or defined in advance after the startup of the engine 70 and the air conditioning device 10 of the vehicle as an end condition, the remote operation support controller 802 may stop the engine 70 and the air conditioning device 10 of the vehicle. Further, for example, when a signal indicating that an operation for stopping the engine 70 and the air conditioning device 10 of the vehicle has been executed has been received from the terminal 200 via the center server 100 by the DCM 90 as an end condition, the remote operation support controller 802 may stop the engine 70 and the air conditioning device 10 of the vehicle.

The function of the remote operation support controller 802 may be provided in the air conditioner ECU 60 or may be provided in another ECU that is configured to communicate with the air conditioner ECU 60 and the engine ECU 80 over an in-vehicle network such as a CAN.

The lock information acquisition unit 803 transmits a lock information acquisition request for requesting acquisition of the above-described lock information (information indicating whether or not the vehicle 2 is locked) to the body ECU 50. The lock information acquisition unit 803 acquires the lock information by receiving the lock information that is replied from the body ECU 50 according to the lock information acquisition request.

The DCM 90 (an example of a vehicle transmission unit) is a communication device that performs bidirectional communication with the center server 100 over a predetermined communication network NW1 (for example, a mobile phone network including a plurality of base stations as terminations, or an Internet network). As described above, the DCM 90 is communicatably connected to various ECUs such as the body ECU 50, the air conditioner ECU 60, and the engine ECU 80 over an in-vehicle network such as a CAN.

The center server 100 includes a communication device 110 and a processing device 120.

The communication device 110 is a device that performs bidirectional communication with the vehicle 2 (DCM 90) and the terminal 200 via the communication networks NW1, NW2 (for example, a mobile phone network including a plurality of base stations as terminations, or an Internet network) under the control of the processing device 120 (a communication processing unit 1201).

The processing device 120 executes various control processes in the center server 100. The processing device 120 may be mainly configured of one or a plurality of server computers including, for example, a CPU, a RAM, a ROM, an auxiliary storage device, or an I/O, and includes a communication processing unit 1201, a relay controller 1202, and an engine startup manner determination unit 1203 as functional units realized by executing, on the CPU, one or more programs stored in a ROM or an auxiliary storage device.

The communication processing unit 1201 (an example of a server transmission unit) controls the communication device 110 to transmit and receive various signals (control signals, information signals, or the like) to and from the vehicle 2 and the terminal 200.

The relay controller 1202 relays various signals between the vehicle 2 and the terminal 200. Details will be described below.

The engine startup manner determination unit 1203 (an example of a controller) determines the startup manner of the engine 70 of the vehicle based on the startup request received from the terminal 200 according to content of the lock information received from the vehicle 2. Specifically, when the lock information received from the vehicle 2 indicates that the vehicle 2 is locked, the engine startup manner determination unit 1203 permits startup of the engine 70 of the vehicle based on the startup request received from the terminal 200. On the other hand, when the lock information received from the vehicle 2 indicates that the vehicle 2 is not locked, that is, the vehicle 2 is unlocked, the engine startup manner determination unit 1203 prohibits the startup of the engine 70 of the vehicle based on the startup request received from the terminal 200. Details of the process of the engine startup manner determination unit 1203 will be described below.

The terminal 200 is, for example, a mobile terminal such as a smartphone or a tablet terminal carried by a user of the vehicle 2. The terminal 200 may be a stationary terminal carried by the user of the vehicle 2, such as a desktop type computer terminal. The terminal 200 includes a communication device 210, a processing device 220, a GPS module 230, and a touch panel display (hereinafter simply referred to as "display") 240.

The communication device 210 is a device that performs bidirectional communication with the center server 100 over a predetermined communication network NW2 under the control of the processing device 220 (specifically, a communication processing unit 2201 to be described below) and is, for example, a Long Term Evolution (LTE) module.

The processing device 220 performs various control processes in the terminal 200. The processing device 220 may be mainly configured of, for example, a computer including a CPU, a RAM, a ROM, an auxiliary storage device, an I/O, and the like, and includes a communication processing unit 2201, a display controller 2202, and a remote operation unit 2203 as functional units that are realized by executing, on the CPU, one or more programs stored in the ROM.

The communication processing unit 2201 (an example of a terminal transmission unit) controls the communication device 210 and transmits and receives various signals to and from the center server 100.

The display controller 2202 displays various images on the display 240. For example, the display controller 2202 displays various graphical user interfaces (GUIs) as operation screens on the display 240.

The remote operation unit 2203 transmits various signals according to the remote operation of the vehicle 2 including a startup request for requesting the startup of the engine 70 and the air conditioning device 10 of the vehicle and a lock request for requesting lock of the vehicle 2 to the center server 100 via the communication processing unit 2201 according to a predetermined operation of the user with respect to a predetermined GUI that is displayed on the display 240 by the display controller 2202. As described above, for example, a startup request transmitted to the center server 100 is transmitted to the vehicle 2 through relaying of the center server 100 (the relay controller 1202), and the engine 70 and the air conditioning device 10 of the vehicle are started up. Further, for example, a lock request transmitted to the center server 100 is transmitted to the vehicle 2 through relaying of the center server 100 (the relay controller 1202), and the vehicle 2 is locked. The user can perform various settings when operating the air conditioning device 10 on a predetermined GUI, and the remote operation unit 2203 transmits various signals such as a startup request including the various settings to the center server 100. As described above, in the vehicle 2, control of the air conditioning device 10 based on the setting content (for example, a set temperature as a requested value of the room temperature by the user, or a set operation time as a requested value of an operation time of the air conditioning device 10 by the user) is performed. A function of the remote operation unit 2203 becomes available, for example, by activating a predetermined application program (hereinafter referred to as "remote operation application") installed in the terminal 200 (the processing device 220) according to a predetermined operation of the user. Details of the process of the remote operation unit 2203 will be described below.

The GPS module 230 receives GPS signals transmitted from three or more satellites, preferably, four or more satellites over the terminal 200, and measures the position of the terminal 200 on which the GPS module 230 is mounted. Position information of the terminal 200 of which the position has been measured is input to the processing device 220.

The position information of the terminal 200 may be acquired through base station position measurement based on signal exchange with the base station instead of or in addition to the GPS position measurement by the GPS module 230.

Details of Operation of Remote Startup System

A specific operation of the remote startup system 1 will be described with reference to FIGS. 5A and 5B.

Figure 5B:
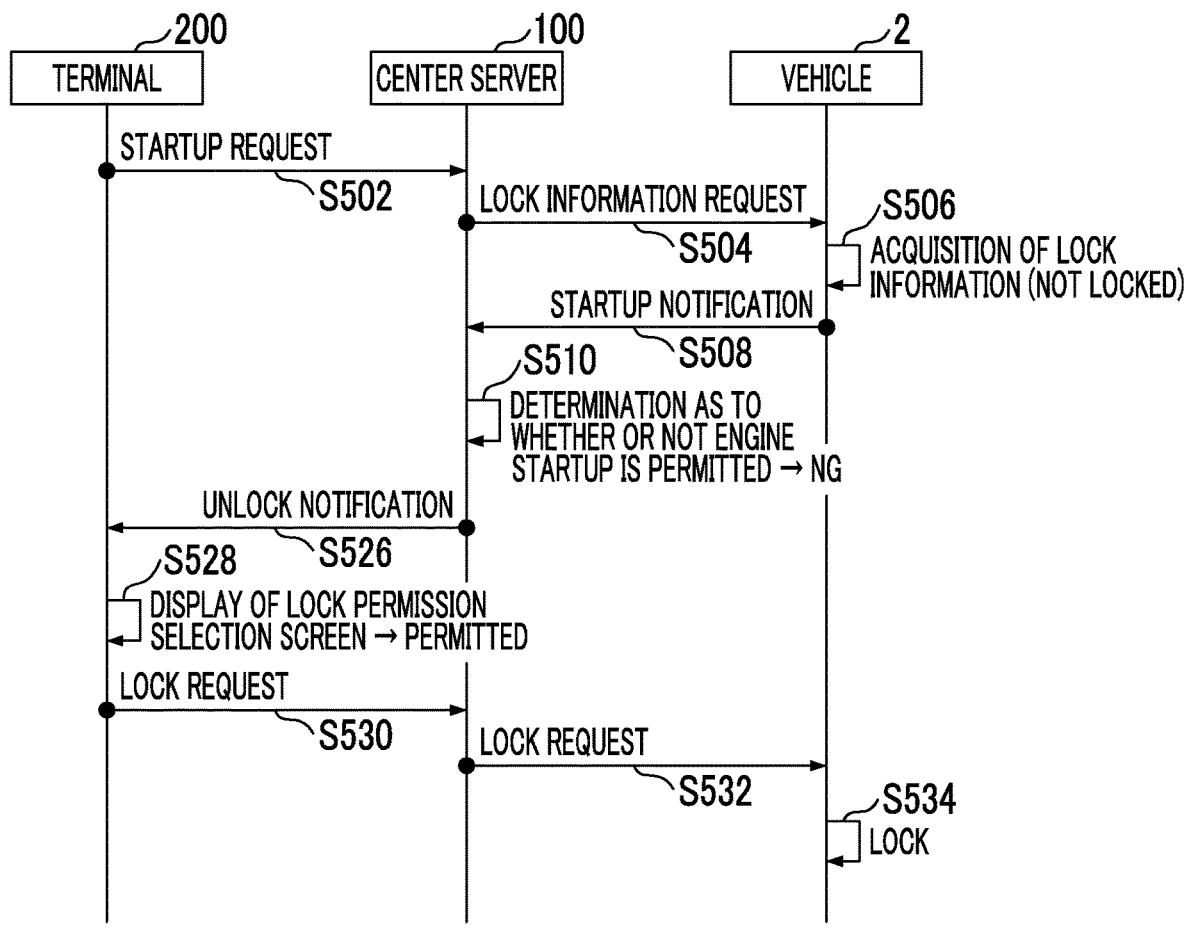
FIG. 5B is a sequence diagram schematically illustrating an example and another example of an operation of the remote startup system according to the first embodiment.

FIGS. 5A and 5B are sequence diagrams schematically illustrating an operation of the remote startup system 1 according to the embodiment. Specifically, FIG. 5A illustrates an example of the operation of the remote startup system 1 according to the embodiment, and more specifically, illustrates the operation of the remote startup system 1 when the vehicle 2 is locked. FIG. 5B illustrates another example of the operation of the remote startup system 1 according to the embodiment, and more specifically, illustrates the operation of the remote startup system 1 when the vehicle 2 is not locked, that is, the vehicle 2 is unlocked.

In FIGS. 5A and 5B, processes in steps S502 to S510 are common, and steps S512 to S524 and steps S526 to S534 are processes specific to FIGS. 5A and 5B, respectively.

As illustrated in FIGS. 5A and 5B, in step S502, the remote operation unit 2203 of the terminal 200 transmits a startup request including various of pieces of setting content (a set temperature, a set operation time, or the like) to the center server 100 via the communication processing unit 1201 according to a predetermined operation with respect to a predetermined GUI by the user.

In step S504, when the startup request is received from the terminal 200 by the communication processing unit 1201, the engine startup manner determination unit 1203 of the center server 100 transmits a lock information request to the vehicle 2 via the communication processing unit 1201.

In step S506, when the lock information request is received from the center server 100 by the DCM 90, the lock information acquisition unit 803 of the vehicle 2 outputs a lock information acquisition request to the body ECU 50 to acquire lock information from the body ECU 50.

In step S508, the lock information acquisition unit 803 of the vehicle 2 transmits the lock information to the center server 100 via the DCM 90.

In step S510, when the lock information is received from the vehicle 2 by the communication processing unit 1201, the engine startup manner determination unit 1203 of the center server 100 determines whether or not to permit the startup of the engine 70 of the vehicle based on the startup request in step S502 according to whether or not the lock information indicates that the vehicle 2 is locked. Specifically, when the lock information indicates that the vehicle 2 is locked, the engine startup manner determination unit 1203 permits the startup of the engine 70 of the vehicle based on the startup request in step S502, and proceeds to step S512 in FIG. 5A. On the other hand, when the lock information indicates that the vehicle 2 is not locked, that is, the vehicle 2 is unlocked, the engine startup manner determination unit 1203 prohibits the startup of the engine 70 of the vehicle based on the startup request in step S502, and proceeds to step S526 in FIG. 5B.

As illustrated in FIG. 5A, in step S512, the engine startup manner determination unit 1203 of the center server 100 transmits the startup request to the vehicle 2 via the communication processing unit 1201.

In step S514, when the startup request is received from the center server 100 by the DCM 90, the remote operation support controller 802 of the vehicle 2 transmits an engine startup request and an air conditioning startup request to the engine controller 801 and the air conditioner ECU 60 to start up the engine 70 and the air conditioning device 10 of the vehicle.

In step S516, the remote operation support controller 802 of the vehicle 2 transmits a startup notification indicating that the engine 70 and the air conditioning device 10 of the vehicle have been started up to the center server 100 via the DCM 90.

In step S518, when the startup notification is received from the vehicle 2 by the communication processing unit 1201, the relay controller 1202 of the center server 100 transfers the startup notification to the terminal 200 via the communication processing unit 1201.

In step S520, when the end conditions are satisfied after the engine 70 of the vehicle has been started up, the remote operation support controller 802 of the vehicle 2 transmits an engine stop request and an air conditioning stop request to the engine controller 801 and the air conditioner ECU 60 to stop the engine 70 and the air conditioning device 10 of the vehicle.

In step S522, the remote operation support controller 802 of the vehicle 2 transmits a stop notification indicating that the engine 70 and the air conditioning device 10 of the vehicle have been stopped, to the center server 100 via the DCM 90.

In step S524, when the stop notification is received from the vehicle 2 by the communication processing unit 1201, the relay controller 1202 of the center server 100 transfers the stop notification to the terminal 200 via the communication processing unit 1201.

On the other hand, as illustrated in FIG. 5B, in step S526, the engine startup manner determination unit 1203 of the center server 100 transmits an unlock notification indicating that the vehicle 2 is unlocked to the terminal 200 via the DCM 90.

In step S528, when the unlock notification is received by the communication processing unit 2201, the remote operation unit 2203 of the terminal 200 displays the unlock notification on the display 240 (an example of a notification unit) via the display controller 2202, and displays a selection screen for causing the user to select whether to lock the vehicle 2 (a lock permission selection screen) on the display 240 (an example of a display unit). When an operation for selecting lock of the vehicle 2 is performed with respect to the lock permission selection screen, the remote operation unit 2203 proceeds to step S530.

In step S530, the remote operation unit 2203 of the terminal 200 transmits a lock request to the center server 100 via the communication processing unit 2201.

In step S532, when the lock request is received from the terminal 200 by the communication processing unit 1201, the relay controller 1202 of the center server 100 transmits a lock request to the vehicle 2 via the communication processing unit 1201.

In step S534, the lock processing unit 501 of the vehicle 2 locks the vehicle 2 when the lock request is received from the center server 100 by the DCM 90. As described above, when the startup request is transmitted from the terminal 200 to the center server 100 again according to a predetermined operation by the user (step S502), the startup of the engine 70 of the vehicle based on the startup request is permitted in the process of step S510. Therefore, the user can start up the engine 70 and the air conditioning device 10 of the vehicle 2.

As described above, in the embodiment, when the startup request is transmitted from the terminal 200 to the center server 100, the lock information acquisition unit 803 acquires the lock information indicating whether or not the vehicle 2 is locked. The engine startup manner determination unit 1203 changes the startup manner of the engine 70 of the vehicle based on the startup request transmitted from the terminal 200 according to whether or not the vehicle 2 is locked, which is indicated by the lock information. Specifically, when the lock information indicates that the vehicle 2 is not locked, that is, that the vehicle 2 is unlocked, the engine startup manner determination unit 1203 prohibits the startup of the engine 70 of the vehicle based on the startup request transmitted from the terminal 200 as long as the vehicle 2 is not locked. When the engine 70 of the vehicle is remotely started up from the terminal 200 via the center server 100, the engine 70 of the vehicle can be started up even from a relatively remote place at which the user cannot visually recognize the vehicle 2, and when the vehicle 2 is unlocked, there is a possibility of a third party starting driving of the vehicle 2. On the other hand, when the vehicle 2 is unlocked, it is possible to make it difficult for the engine 70 of the vehicle to be started up through the remote operation from the terminal 200. Thus, it is possible to reduce the possibility of a third party other than an owner of the vehicle being able to use the vehicle 2.

In the embodiment, the lock processing unit 501 of the vehicle 2 locks the vehicle 2 according to the lock request transmitted from the remote operation unit 2203 of the terminal 200 to the vehicle 2 via the center server 100. When the unlock notification is received from the center server 100 via the communication processing unit 2201, the remote operation unit 2203 displays the fact that the vehicle 2 is unlocked on the display 240. Accordingly, according to the lock request transmitted from the terminal 200 to the center server 100, the vehicle 2 can be remotely locked, and when the vehicle 2 is unlocked, the user is notified of the unlocking of the vehicle 2, and can recognize a reason for a change in the startup manner of the engine 70 of the vehicle. Therefore, the user can start up the engine 70 of the vehicle 2 by remotely locking the vehicle 2 and, for example, by transmitting the startup request again from the terminal 200.

In the embodiment, when the unlock notification is received from the center server 100 by the communication processing unit 2201, the remote operation unit 2203 displays the selection screen for causing the user to select whether to lock the vehicle 2 (the lock permission selection screen) on the display 240. The remote operation unit 2203 transmits the lock request to the vehicle 2 via the center server 100 when an operation for selecting the lock of the vehicle 2 is performed on the lock permission selection screen. As described above, when the vehicle 2 is unlocked, the selection screen for causing the user to select whether to remotely lock the vehicle 2 is automatically displayed. Therefore, the lock of the vehicle 2 can be performed through the operation on the selection screen. Therefore, convenience of the user can be improved.

Second Embodiment

A second embodiment will be described.
Configuration of Remote Startup System
The configuration of the remote startup system 1 according to the embodiment will be described with reference to FIGS. 6 and 7.

Since an overall configuration of the remote startup system 1 and a functional configuration of the terminal 200 according to the embodiment are shown in FIGS. 1 and 4, as in the first embodiment, illustration thereof will be omitted.

Figure 6:
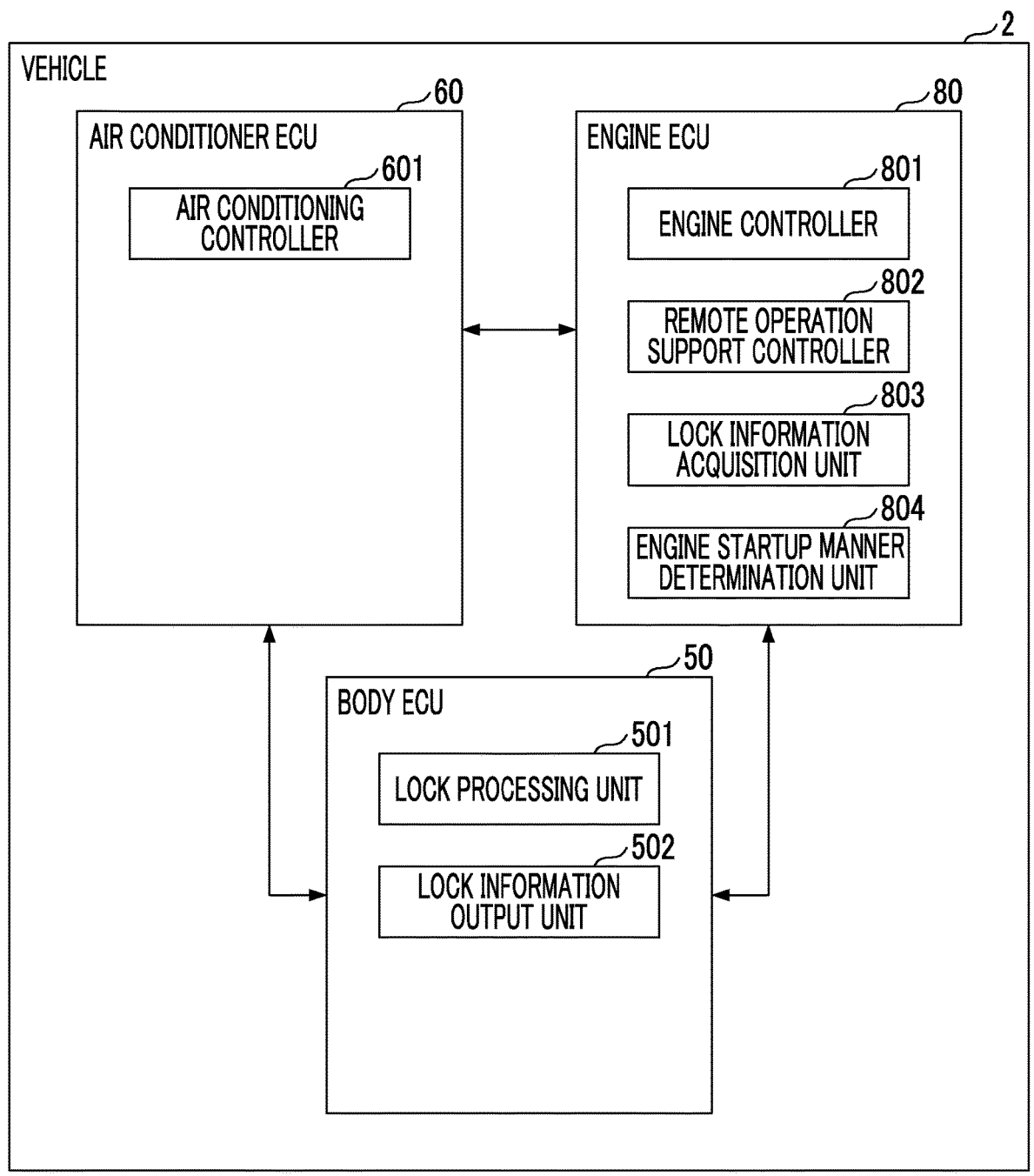
FIG. 6 is a functional block diagram illustrating an example of a functional configuration of a vehicle (a body ECU, an air conditioner ECU, and an engine ECU) according to a second embodiment.
Figure 7:
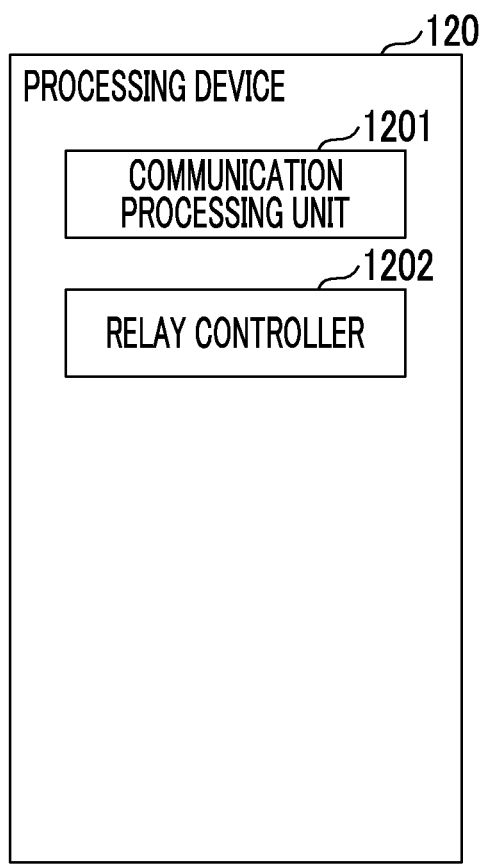
FIG. 7 is a functional block diagram illustrating an example of a functional configuration of a center server (a processing device) according to a second embodiment.

FIG. 6 is a functional block diagram illustrating an example of a functional configuration of the vehicle 2 (the body ECU 50, the air conditioner ECU 60, and the engine ECU 80) according to the embodiment. FIG. 7 is a functional block diagram illustrating an example of the functional configuration of the center server 100 (the processing device 120) according to the embodiment.

This embodiment is different from the first embodiment in that, in the remote startup system 1 according to the embodiment, the engine startup manner determination unit 1203 of the center server 100 is omitted, and instead, an engine startup manner determination unit 804 having the same function is provided in the vehicle 2. Hereinafter, a difference with the first embodiment will be mainly described.

The remote operation support controller 802 transmits an engine startup request and an air conditioning startup request to the engine controller 801 and the air conditioner ECU 60 to start up the engine 70 and the air conditioning device 10 of the vehicle according to the startup request from the engine startup manner determination unit 804. When predetermined end conditions are satisfied after the engine 70 and the air conditioning device 10 of the vehicle are started up, the remote operation support controller 802 transmits an engine stop request and an air conditioning stop request to the engine controller 801 and the air conditioner ECU 60 to stop the engine 70 and the air conditioning device 10 of the vehicle, as in the first embodiment.

Similar to the engine startup manner determination unit 1203 of the first embodiment, the engine startup manner determination unit 804 (another example of the controller) determines the startup manner of the engine 70 of the vehicle based on the startup request received from the terminal 200 according to the content of the lock information acquired by the lock information acquisition unit 803. Specifically, when the lock information acquired by the lock information acquisition unit 803 indicates that the vehicle 2 is locked, the engine startup manner determination unit 804 permits the startup of the engine 70 of the vehicle based on the startup request received from the terminal 200. On the other hand, when the lock information acquired by the lock information acquisition unit 803 indicates that the vehicle 2 is not locked, that is, that the vehicle 2 is unlocked, the engine startup manner determination unit 804 prohibits the startup of the engine 70 of the vehicle based on the startup request received from the terminal 200. Details of the process of the engine startup manner determination unit 804 will be described below.

Details of Operation of Remote Startup System
The operation of the remote startup system 1 according to the embodiment will be described in detail with reference to FIGS. 8A and 8B.

Figure 8A:
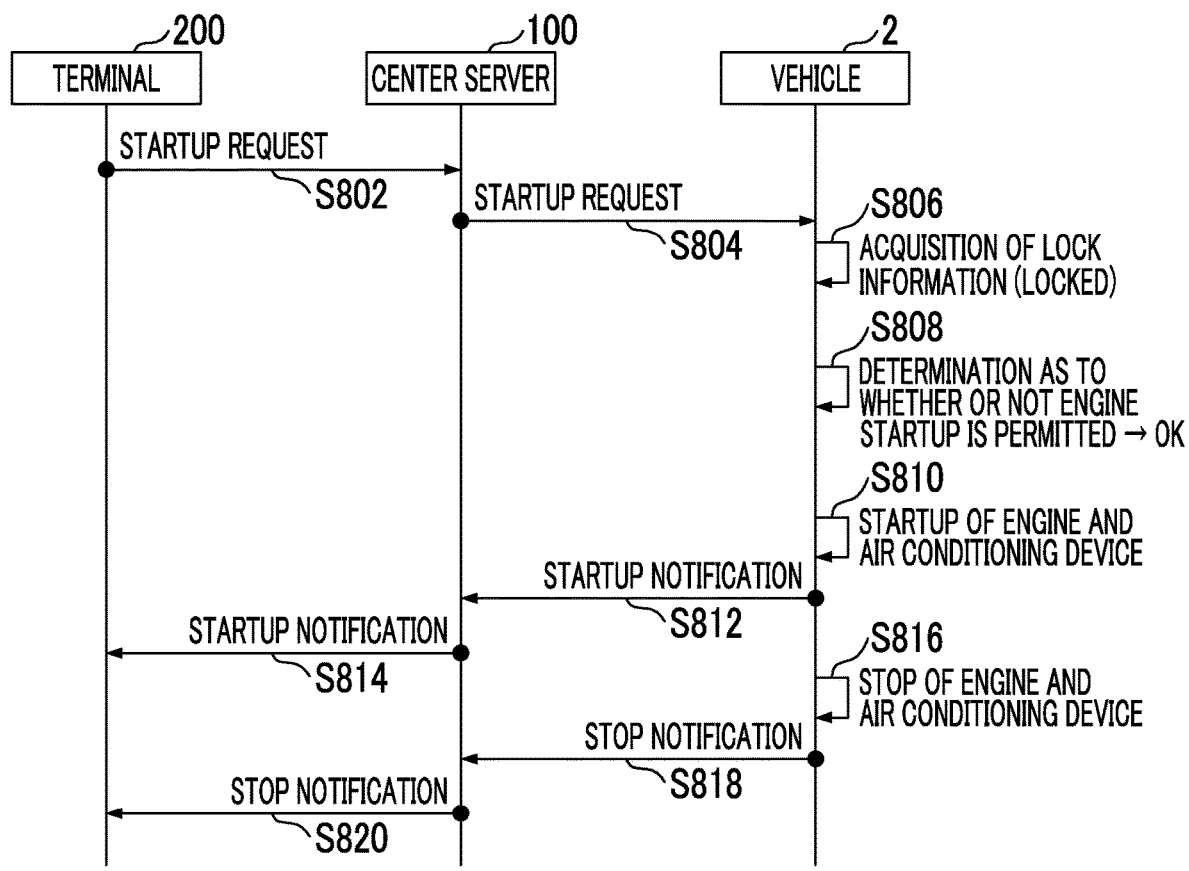
FIG. 8A is a sequence diagram schematically illustrating an example and another example of an operation of the remote startup system according to the second embodiment.
Figure 8B:
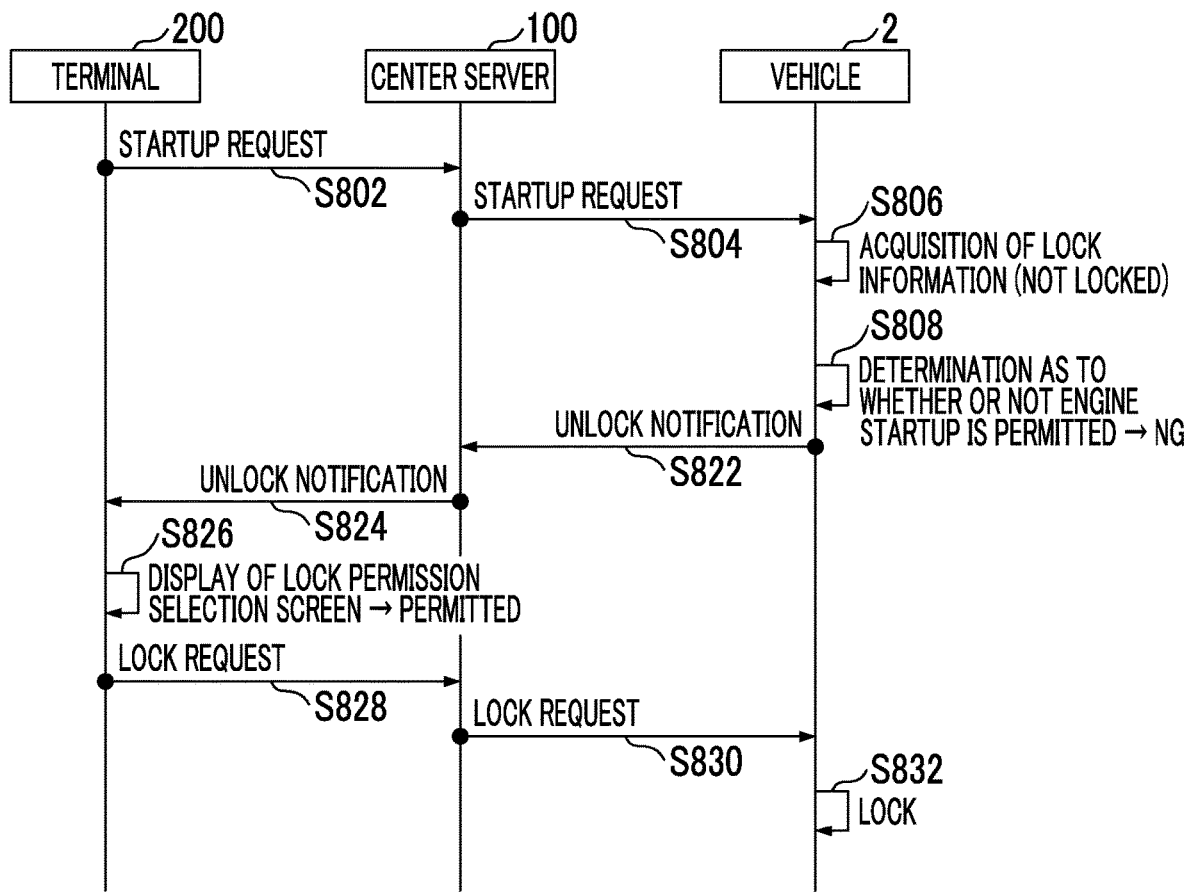
FIG. 8B is a sequence diagram schematically illustrating an example and another example of an operation of the remote startup system according to the second embodiment.

FIGS. 8A and 8B are sequence diagrams schematically illustrating an operation of the remote startup system 1 according to the embodiment. Specifically, FIG. 8A illustrates an example of the operation of the remote startup system 1 according to the embodiment, and more specifically, illustrates the operation of the remote startup system 1 when the vehicle 2 is locked. FIG. 8B illustrates another example of the operation of the remote startup system 1 according to the embodiment, and more specifically, illustrates the operation of the remote startup system 1 when the vehicle 2 is not locked, that is, the vehicle 2 is unlocked.

In FIGS. 8A and 8B, processes of steps S802 to S808 are common, and steps S810 to S820 and steps S822 to S832 are processes specific to FIGS. 8A and 8B, respectively. Since the processes of steps S812 to S820 in FIG. 8A are the same as the processes of steps S516 to S524 in FIG. 5A, description thereof will be omitted. Since processes of steps S826 to S832 in FIG. 8B are the same as the processes of steps S528 to S534 in FIG. 5B, description thereof will be omitted.

As illustrated in FIGS. 8A and 8B, in step S802, the remote operation unit 2203 of the terminal 200 transmits a startup request including various of pieces of setting content (a set temperature, a set operation time, or the like) to the center server 100 via the communication processing unit 1201 according to a predetermined operation with respect to a predetermined GUI by the user.

In step S804, when the startup request is received from the terminal 200 by the communication processing unit 1201, the relay controller 1202 of the center server 100 transfers the startup request to the vehicle 2 via the communication processing unit 1201.

In step S806, when the startup request is received from the center server 100 by the DCM 90, the lock information acquisition unit 803 of the vehicle 2 outputs a lock information acquisition request to the body ECU 50 to acquire the lock information from the body ECU 50.

In step S808, when the lock information is acquired by the lock information acquisition unit 803, the engine startup manner determination unit 804 of the vehicle 2 determines whether or not to permit the startup of the engine 70 of the vehicle based on the startup request in step S802 according to whether or not the lock information indicates that the vehicle 2 is locked. Specifically, when the lock information indicates that the vehicle 2 is locked, the engine startup manner determination unit 804 permits the startup of the engine 70 of the vehicle based on the startup request in step S802, and proceeds to step S810 in FIG. 8A. On the other hand, when the lock information indicates that the vehicle 2 is not locked, that is, the vehicle 2 is unlocked, the engine startup manner determination unit 804 prohibits the startup of the engine 70 of the vehicle based on the startup request in step S802, and proceeds to step S822 in FIG. 8B.

As illustrated in FIG. 8A, in step S810, the engine startup manner determination unit 804 of the vehicle 2 transmits a startup request to the remote operation support controller 802. The remote operation support controller 802 transmits an engine startup request and an air conditioning startup request to the engine controller 801 and the air conditioner ECU 60 to start up the engine 70 and the air conditioning device 10 of the vehicle according to the startup request.

On the other hand, as illustrated in FIG. 8B, in step S822, the engine startup manner determination unit 804 of the vehicle 2 transmits an unlock notification indicating that the vehicle 2 is unlocked to the center server 100 via the DCM 90.

In step S824, when the unlock notification is received from the vehicle 2 by the communication processing unit 1201, the relay controller 1202 of the center server 100 transmits the unlock notification to the terminal 200 via the communication processing unit 1201.

As described above, in the embodiment, the same process as that in the first embodiment is performed by the engine startup manner determination unit 804 provided in the vehicle 2. That is, the same advantageous effects as those of the first embodiment can be obtained mainly by the process in the vehicle 2.

Although the embodiments for carrying out the present disclosure have been described in detail above, the present disclosure is not limited to the above-described specific embodiments, and various modifications and changes can be performed within the scope of the gist of the present disclosure described in the claims.

First Modification Example

For example, Although the function of changing the startup manner of the engine 70 of the vehicle based on the startup request transmitted from the terminal 200 to the center server 100 is provided in the center server 100 (the engine startup manner determination unit 1203) or the vehicle 2 (the engine startup manner determination unit 804) in the above-described embodiment, the function may be provided in the terminal 200. In this case, when the operation of transmitting the startup request to the center server 100 is performed, the terminal 200 may transmit the lock information request to the vehicle 2 via the center server 100 instead of the startup request. The terminal 200 may change the startup manner of the engine 70 of the vehicle based on content of the lock information replied from the vehicle 2 via the center server 100 according to the lock information request. For example, when the lock information indicates that the vehicle 2 is locked, the terminal 200 may transmit the startup request to the vehicle 2 via the center server 100. Further, for example, when the lock information indicates that the vehicle 2 is unlocked, the terminal 200 may display the fact that the vehicle 2 is unlocked, and the lock permission selection screen on the display 240, similar to the above-described embodiment.

Second Modification Example

Although the lock information acquisition unit 803 acquires the lock information when the startup request is transmitted from the terminal 200 in the embodiment and the modification example described above, the lock information may be acquired in a stage before the startup request is transmitted. Specifically, the lock information acquisition unit 803 may acquire the lock information when the above-described remote operation application, that is, the function of transmitting a transmission request is activated in the terminal 200. In this case, the terminal 200 may transmit the activation notification indicating that the remote operation application has been activated to the center server 100 via the communication processing unit 1201. As described above, for example, since the activation notification is transmitted to the center server 100 and the vehicle 2 through the same process as the process of step S502 of FIGS. 5A and 5B and the process of steps S802 and S804 of FIGS. 8A and 8B, the center server 100 and the vehicle 2 can recognize that the remote operation application has been activated in the terminal 200.

Third Modification Example

In the embodiments and the modification examples described above, when the startup of the engine 70 of the vehicle based on the startup request transmitted from the terminal 200 to the center server 100 is prohibited, it is needed to transmit the startup request again, but the present disclosure is not limited to the above aspect. For example, even when the startup of the engine 70 of the vehicle is prohibited in steps S512 and S810 of FIGS. 5A and 8A, and then, in a case where the vehicle 2 is locked as in the processes of steps S534 and S832 based on the lock request transmitted from the terminal 200 to the center server 100 within a predetermined time, the engine 70 of the vehicle may be started up without requiring transmission of the startup request again. Thus, convenience for the user is improved.

Fourth Modification Example

In the embodiments and the modification examples described above, when the lock information indicates that the vehicle 2 is unlocked, the startup of the engine 70 of the vehicle based on the startup request transmitted from the terminal 200 is prohibited, but the aspect is not limited as long as the startup manner of the engine 70 of the vehicle can be changed so that it is difficult for the engine 70 of the vehicle to be started up as compared with the case in which the vehicle 2 is locked, in a state in which the vehicle 2 is unlocked.

For example, when the lock information indicates that the vehicle 2 is unlocked and the startup request has already been transmitted from the terminal 200 to the center server 100, the remote operation unit 2203 displays a selection screen for causing the user to select whether to desire to start up the engine of the vehicle (a startup permission selection screen) on the display 240 of the terminal 200. An aspect in which the engine startup manner determination unit 804 or 1203 starts up the engine 70 of the vehicle based on the startup request when an operation for selecting startup of the engine 70 of the vehicle is performed with respect to the startup permission selection screen in a case where the lock information indicates that the vehicle 2 is unlocked may be adopted. In this case, the remote operation unit 2203 transmits, via the communication processing unit 2201, a result of the selection operation in the startup permission selection screen to the center server 100 or the vehicle 2 via the center server 100.

Further, for example, the engine startup manner determination unit 804 or 1203 may prohibit the transmission of the startup request from the terminal 200 to the center server 100 in a case in which the lock information acquired by the lock information acquisition unit 803 when the remote operation application has been activated indicates that the vehicle 2 is unlocked. In this case, the unlock notification is received from the center server 100 via the communication processing unit 2201, the remote operation unit 2203 may disable, for example, a virtual button on a screen for transmitting the startup request to be operated via the display controller 2202. The remote operation unit 2203 may simultaneously display a reason why the button cannot be operated, that is, the fact that the vehicle 2 is unlocked on the display 240 via the display controller 2202.

Fifth Modification Example

In the embodiments and the modification examples described above, when the startup request is transmitted from the terminal 200 to the center server 100 or when the remote operation application is activated in the terminal 200, a determination as to whether the startup of the engine 70 of the vehicle is permitted is performed by the engine startup manner determination unit 804 or 1203 (step S510 or S808), but the present disclosure is not limited to the above aspect. For example, when a distance between the vehicle 2 and the user, that is, a distance between the vehicle 2 and the terminal 200 is equal to or smaller than a predetermined threshold value, which indicates that the vehicle 2 and the terminal 200 can be determined to be relatively close to each other, the engine startup manner determination unit 804 or 1203 may start up the engine 70 of the vehicle according to the startup request that is transmitted from the terminal 200 regardless of content of the lock information. This is because it is conceivable that a possibility of the vehicle 2 being used by a third party may be low and convenience of the user may be prioritized when the distance between the vehicle 2 and the user is small to a certain extent. In this case, the engine startup manner determination unit 1203 (an example of the user position information acquisition unit or the vehicle position information acquisition unit) of the center server 100 transmits a position information request for requesting acquisition of the position information to the terminal 200 and the vehicle 2 via the communication processing unit 1201. As described above, the engine startup manner determination unit 1203 can acquire the position information of the terminal 200, that is, position measurement information obtained by the GPS module 230 and position information of the vehicle 2, that is, position measurement information obtained by the GPS module 40, which is replied according to the position information request from the terminal 200 and the vehicle 2. The engine startup manner determination unit 804 (another example of the user position information acquisition unit or the vehicle position information acquisition unit) of the vehicle 2 can acquire the position information of the vehicle 2 from the GPS module 40. The engine startup manner determination unit 804 can acquire the position information of the terminal 200, that is, the position measurement information of the GPS module 230 that is replied from the terminal 200 by transmitting the position information request for requesting the acquisition of the position information to the terminal 200 via the DCM 90 and the center server 100.

What is claimed is:

1. A remote startup system including a terminal of a user, a center server that is configured to communicate with the terminal, and a vehicle that is configured to communicate with the center server, the remote startup system being configured to start up an engine of the vehicle according to a startup request transmitted from the terminal to the center server, the remote startup system comprising:
    an engine electronic control unit (ECU) comprising a central processing unit (CPU), a random access memory (RAM), a read only memory (ROM) and configured to acquire lock information indicating whether or not the vehicle is locked when a function of transmitting the startup request that is included in the terminal is activated; and
    a controller configured to change a startup manner of the engine based on the startup request according to whether the lock information indicates that the vehicle is locked, which is a state in which all of a plurality of doors of the vehicle are locked or indicates that the vehicle is unlocked, which is a state in which at least one of the doors of the vehicle is unlocked,
    wherein the controller is configured to prohibit startup of the engine based on the startup request as long as the vehicle is not locked when the lock information indicates that the vehicle is unlocked,
    wherein when the startup request is transmitted to the vehicle, the user is notified that the vehicle is unlocked if the vehicle is unlocked and prohibited from startup, and
    wherein after the user is notified that the vehicle is unlocked, the controller is further configured to:
        receive, via the center server, a lock request for requesting locking of the vehicle from the terminal;
        lock, via a body electronic control unit (ECU) provided in the vehicle, the vehicle upon receiving the lock request from the center server, the vehicle being locked within a predetermined time after the user is notified that the vehicle is unlocked; and upon the vehicle being locked, start up the engine of the vehicle without requiring transmission of another startup request from the terminal.

2. The remote startup system according to claim 1, further comprising:

a notification unit comprising a display provided in the terminal, the notification unit being configured to notify the user that the vehicle is unlocked when the lock information indicates that the vehicle is unlocked; and a display unit provided in the terminal, the display unit being configured to display a selection screen for causing the user to select whether to desire to start up the engine when the lock information indicates that the vehicle is unlocked, and the startup request is transmitted from the terminal to the center server, wherein the controller is configured to start up the engine according to the startup request when an operation for selecting startup of the engine is performed with respect to the selection screen when the lock information indicates that the vehicle is unlocked.

3. The remote startup system according to claim 1, wherein the controller is configured to prohibit transmission of the startup request from the terminal to the center server in a case where the lock information acquired by the engine ECU when the function is activated indicates that the vehicle is unlocked.

4. The remote startup system according to claim 1, further comprising:

a processing device provided in the terminal, the processing device being configured to transmit the lock request for requesting lock of the vehicle to the center server;

another processing device provided in the center server, the another processing device being configured to transmit the lock request received from the terminal to the vehicle;

the body electronic control unit (ECU) comprising a central processing unit (CPU), a random access memory (RAM), a read only memory (ROM) and provided in the vehicle, the body ECU being configured to lock the vehicle when the lock request is received from the center server; and a notification unit comprising a display provided in the terminal, the notification unit being configured to notify the user that the vehicle is unlocked when the lock information indicates that the vehicle is unlocked.

5. The remote startup system according to claim 4, further comprising a display unit provided in the terminal, the display unit being configured to display a selection screen for causing the user to select whether to lock the vehicle when the lock information indicates that the vehicle is unlocked, wherein the processing device is configured to transmit the lock request to the center server when an operation for selecting lock of the vehicle is performed with respect to the selection screen.

6. The remote startup system according to claim 4, further comprising a data communication module (DCM) provided in the vehicle, the data communication module including a communication device for performing bidirectional communication and being configured to transmit data to the center server, wherein:

the another processing device is configured to transmit a lock information request for requesting the lock information to the vehicle when the startup request or an activation notification indicating that the function is activated is received from the terminal;

the engine ECU is provided in the vehicle and configured to acquire the lock information when the lock information request is received from the center server;

the data communication module is configured to transmit the lock information acquired by the engine ECU to the center server; and the controller is provided in the center server and configured to change the startup manner based on the lock information received from the vehicle.

7. The remote startup system according to claim 4, wherein:

the another processing device is configured to transmit the startup request or an activation notification indicating that the function is activated to the vehicle when the startup request or the activation notification is received from the terminal;

the engine ECU is provided in the vehicle and configured to acquire the lock information when the startup request or the activation notification is received from the center server; and the controller is provided in the vehicle and configured to change the startup manner based on the lock information acquired by the engine ECU.

8. The remote startup system according to claim 1, wherein the another processing device is configured to acquire position information of the terminal; and to acquire position information of the vehicle, wherein the controller is configured to start up the engine according to the startup request regardless of content of the lock information when a distance between the vehicle and the terminal is equal to or smaller than a predetermined threshold value from the position information of the terminal and the position information of the vehicle acquired by the another processing device.

9. A center server connected to a terminal of a user and a vehicle and configured to communicate with the terminal and the vehicle, the center server being configured to receive a startup request of an engine of the vehicle that is transmitted from the terminal and transmit the startup request to the vehicle to start up the engine, the center server comprising:

another processing device configured to transmit a lock information request for requesting lock information indicating whether or not the vehicle is locked to the vehicle when an activation notification indicating that a function of transmitting the startup request included in the terminal is activated is received from the terminal; and a controller configured to change a startup manner of the engine based on the startup request according to whether the lock information received from the vehicle indicates that the vehicle is locked, which is a state in which all of a plurality of doors of the vehicle are locked or indicates that the vehicle is unlocked, which is a state in which at least one of the doors of the vehicle is unlocked, wherein the controller is configured to prohibit startup of the engine based on the startup request as long as the vehicle is not locked when the lock information indicates that the vehicle is unlocked, wherein when the startup request is transmitted to the vehicle, the user is notified that the vehicle is unlocked if the vehicle is unlocked and prohibited from startup, and wherein after the user is notified that the vehicle is unlocked, the controller is further configured to:

receive, via the center server, a lock request for requesting locking of the vehicle from the terminal;

lock, via a body electronic control unit (ECU) provided in the vehicle, the vehicle upon receiving the lock request from the center server, the vehicle being locked within a predetermined time after the user is notified that the vehicle is unlocked; and upon the vehicle being locked, start up the engine of the vehicle without requiring transmission of another startup request from the terminal.

10. A vehicle connected to a center server and configured to communicate with the center server, the center server being configured to communicate with a terminal of a user, the vehicle being configured to start up an engine according to a startup request for requesting startup of the engine that is transmitted from the terminal via the center server, the vehicle comprising:

an engine electronic control unit (ECU) comprising a central processing unit (CPU), a random access memory (RAM), a read only memory (ROM) and configured to acquire lock information indicating whether or not the vehicle is locked when an activation notification indicating that a function of transmitting the startup request included in the terminal is activated, the activation notification being transmitted from the terminal via the center server, is received from the center server; and a controller configured to change a startup manner of the engine based on the startup request according to whether the lock information indicates that the vehicle is locked, which is a state in which all of a plurality of doors of the vehicle are locked or indicates that the vehicle is unlocked, which is a state in which at least one of the doors of the vehicle is unlocked, wherein the controller is configured to prohibit startup of the engine based on the startup request as long as the vehicle is not locked when the lock information indicates that the vehicle is unlocked, wherein when the startup request is transmitted to the vehicle, the user is notified that the vehicle is unlocked if the vehicle is unlocked and prohibited from startup, and wherein after the user is notified that the vehicle is unlocked, the controller is further configured to:

receive, via the center server, a lock request for requesting locking of the vehicle from the terminal;

lock, via a body electronic control unit (ECU) provided in the vehicle, the vehicle upon receiving the lock request from the center server, the vehicle being locked within a predetermined time after the user is notified that the vehicle is unlocked; and upon the vehicle being locked, start up the engine of the vehicle without requiring transmission of another startup request from the terminal.

11. The remote startup system according to claim 1, wherein the controller is further configured to:

receive, via the center server, another startup request for requesting startup of the engine of the vehicle from the terminal; and start-up the engine of the vehicle based on the another startup request.

\* \* \* \* \*